United States Patent [19]

Honda

[11] 3,950,724
[45] Apr. 13, 1976

[54] HORIZONTAL FISH DETECTION SONAR

[76] Inventor: Keisuke Honda, 37, Shinyoshi-cho, Toyohashi Aichi, Japan

[22] Filed: Aug. 20, 1974

[21] Appl. No.: 499,034

[30] Foreign Application Priority Data
Aug. 22, 1973  Japan.............................. 48-94024

[52] U.S. Cl............................................. 340/3 R
[51] Int. Cl.².......................... G01S 9/68; G01S 9/70
[58] Field of Search ..................................... 340/3 R

[56] References Cited
UNITED STATES PATENTS

| 3,039,079 | 6/1962 | Walters et al....................... | 340/3 R |
| 3,212,055 | 10/1965 | Grieg .................................. | 340/3 R |

Primary Examiner—Richard A. Farley
Attorney, Agent, or Firm—Burgess Ryan and Wayne

[57] ABSTRACT

A horizontal fish detection sonar comprising an ultrasonic transducer emitting an ultrasonic wave spreading in a vertical plane, a plural number of receiving transducers arranged within the angle of the spreading ultrasonic wave, a control device permitting signals from said receiving transducers to be sampled in succession for a short time $\Delta t$ after a predetermined time T from the emission of said ultrasonic wave, and a display device displaying said sampled signals in succession, is capable of detecting the depth of water, a target (a school of fish), or an obstruction at any determined distance from the present location in the emission direction of said ultrasonic wave.

4 Claims, 4 Drawing Figures

HORIZONTAL FISH DETECTION SONAR

BACKGROUND OF THE INVENTION

This invention relates to a horizontal fish detection sonar which detects the depth of water, a school of fish, etc. at any determined distance in the direction of the travelling sound wave.

One of the vertical fish detection sonars widely used in the prior art fish detection sonar emits ultrasonic waves from the bottom of the ship toward the bottom of the sea and receives reflected waves from the bottom of the sea or a swimming school so as to measure the depth of water at the present location or the distance from the ship to a school of fish.

One of the horizontal fish detection sonar widely used in the prior art fish detection sonar emits an ultrasonic wave in a horizontal direction in the front of the ship and receives reflected waves from a target, a school of fish, or obstructions so as to measure the distance from the ship to the target, the school of fish, or the obstructions.

However, the prior art fish detection sonars of the type described have a distinct defect that it is impossible to measure the depth of water, a school of fish, or obstructions at any determined distance in the front of the ship.

SUMMARY OF THE INVENTION

The primary object of the present invention is therefore to provide a horizontal fish detection sonar capable of indicating the depth of water or a target at any determined distance from the present location.

According to the present invention a horizontal fish detection sonar comprising a transmitter emitting an ultrasonic wave spreading in a vertical plane, a plural number of receivers located within the angle of the spreading ultrasonic wave, a control device permitting signals from said receivers to be sampled in succession for a minimum time $\Delta t$ after a predetermined time T from the emission of the ultrasonic wave, and a display device desplaying the sampled signals in succession is capable of detecting the depth of water or a terget at any determined distance in the direction in which the ultrasonic wave is emitted.

DESCRIPTION OF THE PREFERRED EMBODIMENTS

Figure 1:
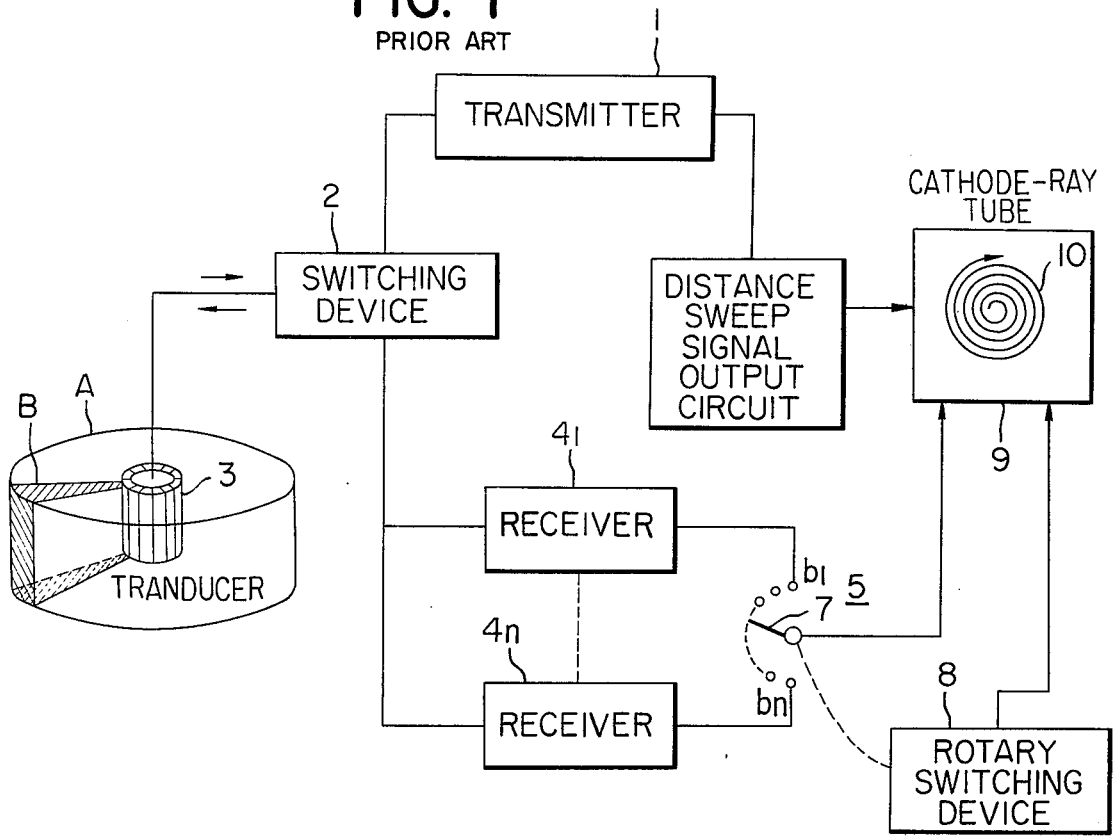
FIG. 1 is a block diagram of a prior art scanning sonar.

Shown in FIG. 1 is a scanning sonar given as an example of the horizontal fish detection sonar. The transmitted signal from a transmitter 1 is sent through a switching device 2 to an ultrasonic transducer 3 which has receiving elements divided on the circumference, and with the ultrasonic transducer 3 as center, a transmitter beam A is emitted in every direction. These elements of the ultrasonic transducer 3 are connected through the switching device 2 to corresponding receivers $4_1$ to $4_n$, as that the output signal of each receiving element of the ultrasonic transducer 3 which has received a received beam B may be separately amplified in each of receivers $4_1$ to $4_n$, and then applied to each of stators $b_1$ to $b_n$ of a sampling switch 5. The sampling switch 5 is a change-distributor switch whose electrodes of stator b and rotor 7 are capacitance-coupled, and is rotated at a high speed by means of a rotary switching device 8 such as a synchronous motor. The output detected at the rotor 7 of the sampling switch 5 is applied to a spot intensity modulation circuit of a cathode-ray tube 9. The sweeping spot 10 or the cathode-ray tube screen performs a rotational azimuth sweep in accordance with an azimuth scanning signal from the rotary switching device 8 synchronized with the scanning switch 5, while it performs distance sweep toward the outer circumference in accordance with the output of a distance sweep signal output circuit. Therefore, the sweeping spot 10 just describes a spiral, and when the trace extends up the the maximum distance on the cathode-ray tube screen, the distance sweep signal output circuit 11 provides an output to the transmitter 1 so that the transmitter 1 may emit a transmitted wave signal and concurrently, the sweeping spot 10 may be returned to the mid portion of the cathode-ray tube screen. This cycle of transmission and reception is repeated.

In this way, in the prior art, it is accomplished to detect the depth of water at the present location or the distance up to a target by detecting the received wave beam reflected from any object, and thereby detecting the distance up to the object; however, it is impossible to know the depth of water at any predetermined position, the depth of a target, etc, remote from the present location.

Figure 2:
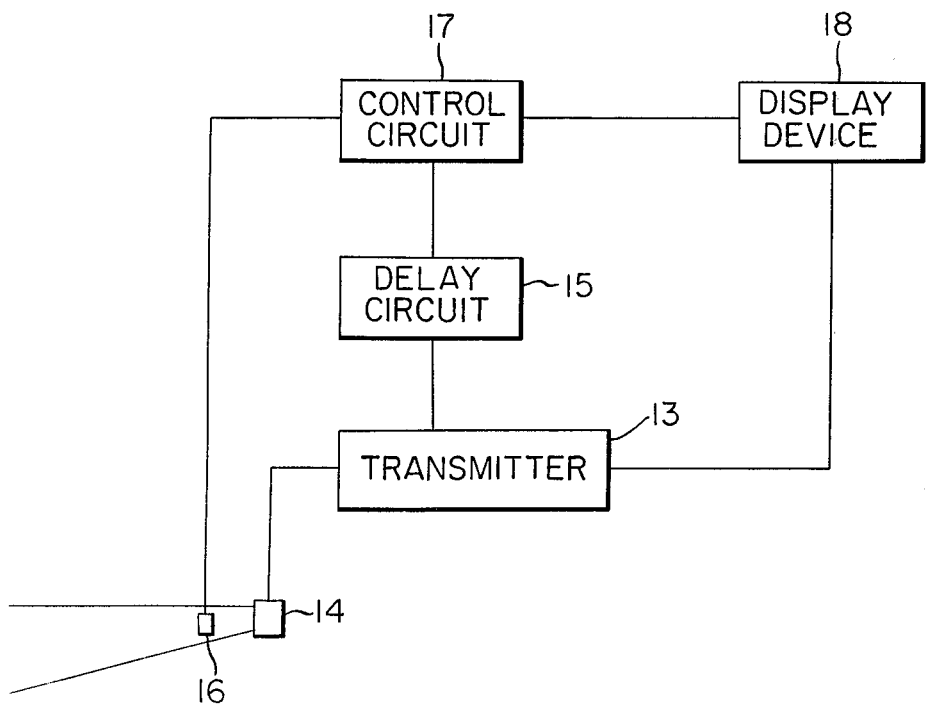
FIGS. 2 and 3 are a block diagram of a fish detection sonar in accordance with an embodiment of the present invention.
Figure 3:
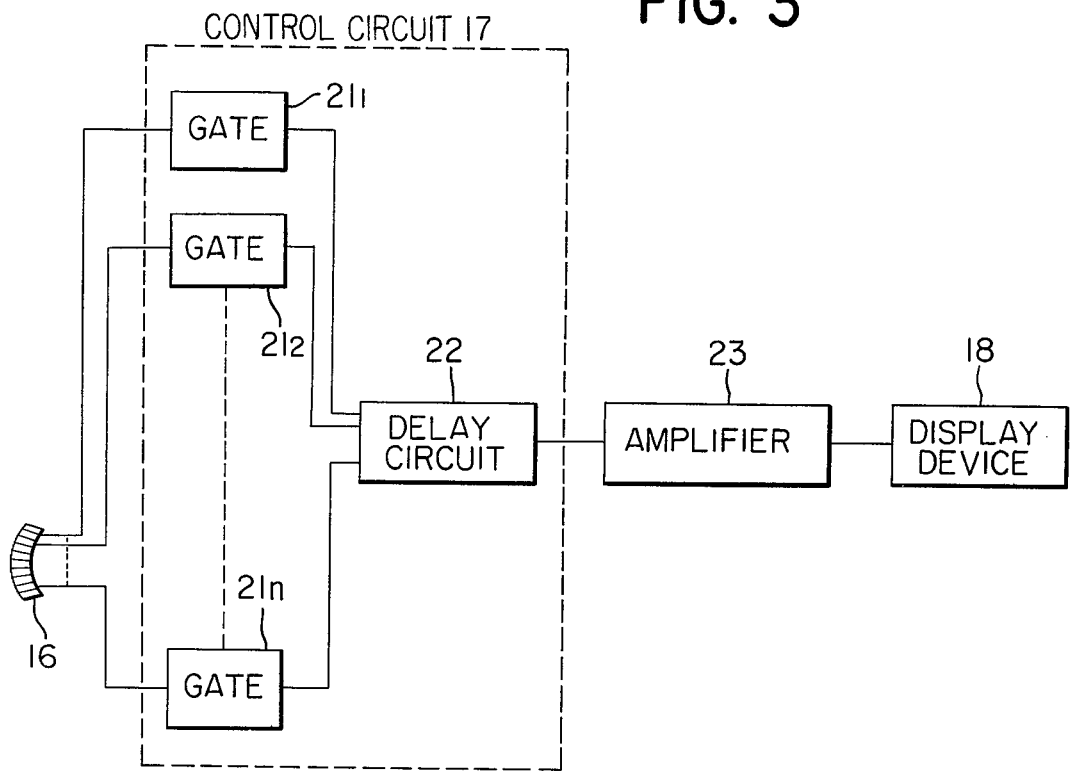

This invention eliminates these disadvantages of the prior art. Referring to FIG. 2, the transmitted wave signal from a transmitter 13 is sent to an ultrasonic transducer 14 and to a delay circuit 15. The ultrasonic transducer 14 emits a fan-shaped beam A of an angle $\theta°$. A receiving transducer 16, similar to transducer 3 has $m$ independent receiving elements in a vertical fan-shaped array, and the received wave signal from each of these receiving elements of the receiving transducer 16 is sent to a control device 17. The control device 17 permits received wave signals to be successively sampled for a time $\Delta t$ in response to the output of the delay circuit 15. The output of delay circuit 15 is provided to the control device 17 after a time T from the sending of the transmitted wave beam. The received wave signal thus passed is amplified and sent to a display device 18. The control device 17 permitting the output from the receiving transducer 16 to be sent to the display device 18 is constructed as shown in FIG. 3. Gates 211 to 21m pass the signals from the receiving transducer for a time $\Delta t$ with signals from the delay circuit 15 after a time T seconds from the sending of the transmitted wave beam from the transmitter 13, and each signal thus passed is delayed in a delay circuit 22, amplified in an amplifier 23, and then provided to the display device 18 which displays the reflected wave after T seconds. Delayed circuit 22 separates the signal contributions of each of the transducer elements 16 by delaying the phase of the signal from each element by a different amount.

In addition, the control device 17 is capable of accomplishing a similar action by operating the scanning switch shown in FIG. 1 to permit only one cycle of scanning after a time T from the sending of the transmitted wave beam. That is, if a single cycle of scanning is initiated after a delay T by energizing the rotary switching device 8 through delay circuit 15 and the rotary switching performs a single scan in the time $\Delta T$, the signal contributions of each element of the transducer 16 are separated as effectively as by the different phase delays of delay circuit 22.

Figure 4:
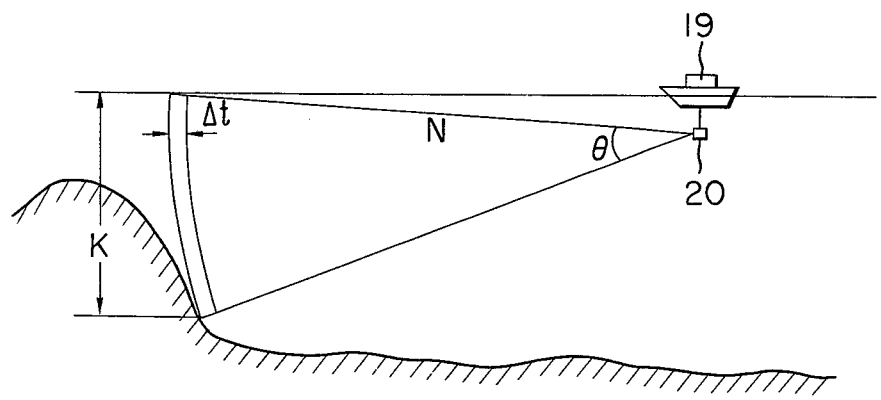
FIG. 4 is a schematic diagram showing the use of the horizontal fish detection sonar according to the present invention.

Referring FIG. 4, in the arrangement as above mentioned a transmitted beam A is sent from a horizontal fish detection sonar 20 mounted in a ship 19, and after T seconds, the received wave beam is received. The distance N from the ship 19, through which the received wave beam has reflected back, is given by $N=1500/2\ T(m)$ (provided that the velocity of sound in the sea water is 1500m/s). Moreover, on assumption that the received wave beam which has first been reflected after T seconds is the one reflected from the surface of the sea, the received wave beam which has been reflected back last may be regarded as the one reflected from a depth of $k=N \tan \theta(m)$ from the surface of the sea. Therefore, the display device 18 displays the condition in the sea water within the range of $k(m)$ from the surface of the sea.

What is claimed is:

1. A horizontal fish detection sonar comprising an ultrasonic transducer means for emitting an ultrasonic wave spreading in a vertical plane, a plural number of receiving transducers arranged within the angle of said spreading ultrasonic wave, a control device means for permitting signals from said receiving transducers to be sampled in succession for a sampling period $\Delta t$ after a predetermined time T seconds from the emission of said ultrasonic wave, and a display device displaying said successively sampled signals, whereby said display device provides information relating to the depth of water, a target (a school of fish), or obstructions at any determined distance from the present location in the direction emitting said ultrasonic wave.

2. A horizontal fish detection sonar as defined in claim 1 wherein said ultrasonic transducer means comprises means for emitting a fan-shaped ultrasonic wave beam, said receiving transducers being located in a fan-shaped arrangement in the plane of the fan-shaped ultrasonic wave beam.

3. A horizontal fish detection sonar as defined in claim 1 wherein said control device means is provided with a scanning switch means for successively sampling said receiving transducers only one time after a predetermined time T from the emission of the ultrasonic wave beam.

4. A horizontal fish detection sonar as defined in claim 1 wherein said control device comprises means for opening each of a plurality of gate circuits only for a time $\Delta t$ after a determined time T from the emission of the ultrasonic wave and for applying the signals passed through said gate circuit to the display device in succession with different phases.

* * * * *